Oct. 26, 1937.  G. V. HIGHSMITH  2,096,853
HYDRAULIC TRANSMISSION
Filed March 3, 1936  5 Sheets-Sheet 3

Fig. 3.

Inventor
G. V. Highsmith.
By Lacey & Lacey, Attorneys

Oct. 26, 1937.  G. V. HIGHSMITH  2,096,853
HYDRAULIC TRANSMISSION
Filed March 3, 1936  5 Sheets-Sheet 5

Patented Oct. 26, 1937

2,096,853

UNITED STATES PATENT OFFICE 2,096,853

HYDRAULIC TRANSMISSION

Gale V. Highsmith, Ames, Iowa, assignor of twenty per cent to Clarence R. Hedden and twenty per cent to Merrill D. Breese, Ames, Iowa Application March 3, 1936, Serial No. 66,907

9 Claims. (Cl. 74—377)

This invention relates to an improved hydraulic transmission and one object of the invention is to provide a hydraulic transmission of high power which will serve very effectively for transmitting rotary motion from a motor shaft to a drive shaft of an automobile or other apparatus having a power shaft and a transmission shaft and cause the transmission shaft to be rotated in a forward direction in either low, second or high speed or in a reverse direction according to the wishes of the operator.

Another object of the invention is to so construct the transmission that it may serve not only as means for transmitting rotary motion from the power shaft to the transmission shaft but also as a power brake to check forward movement of an automobile.

Another object of the invention is to so construct the improved transmission that a quick start may be made without shifting gears and thus eliminate choking of the engine and also prevent bucking or damage due to stripping gears.

Another object of the invention is to provide a gear shift which is very easy to operate, as a gear shift lever which must be moved in a number of directions for selecting gears is eliminated, and to further provide a hydraulic transmission in which change from one speed to another may be easily and quickly made as a certain speed does not have to be attained before a change may be made from low to second or second to high speed.

Another object of the invention is to not only provide a transmission of such construction that an automobile will run very smoothly but will also permit shifting from one speed to another and, in addition, permit a greater selectivity of speeds as the speed is gradually increased or decreased from low to high and not in step by step movements.

The invention is illustrated in the accompanying drawings, wherein.

Figures 1, 9:
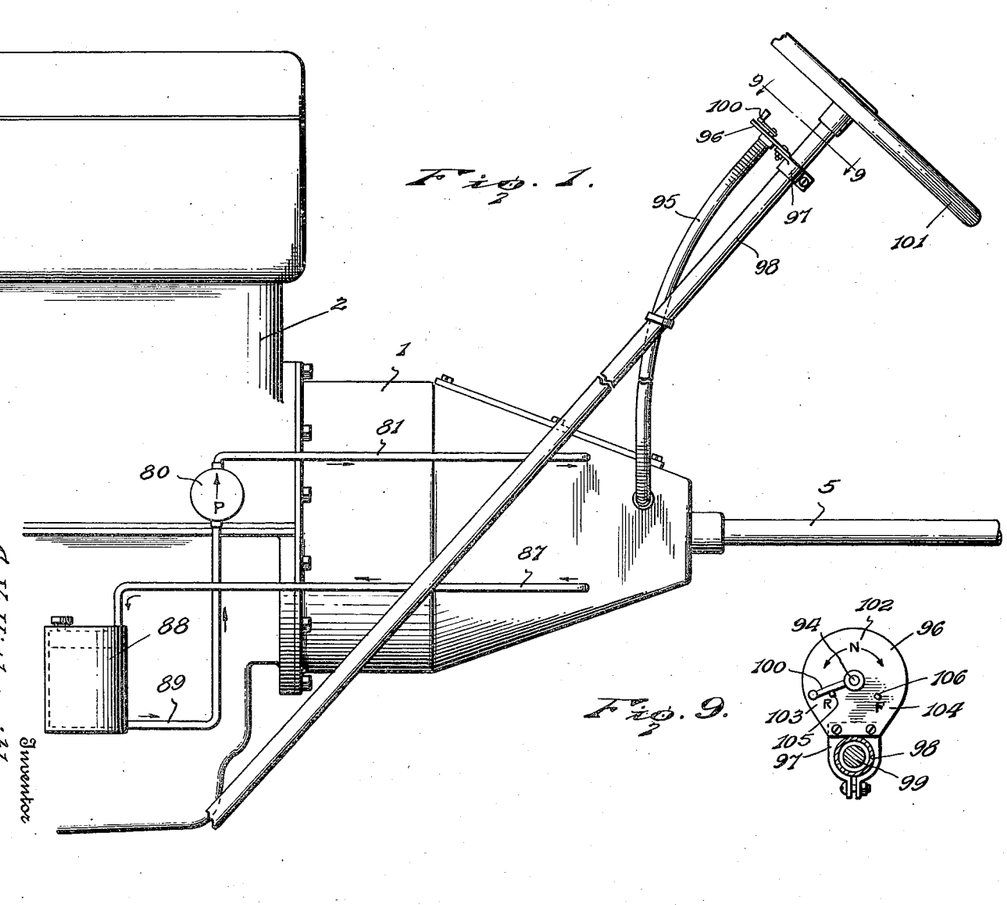
Figure 1 is a view in side elevation showing a portion of an engine having the improved transmission associated therewith.
Figure 9 is a fragmentary view taken along the line 9—9 of Figure 1 looking toward the control device mounted upon the steering post and adapted to be actuated by the operator of the automobile.
Figure 2:
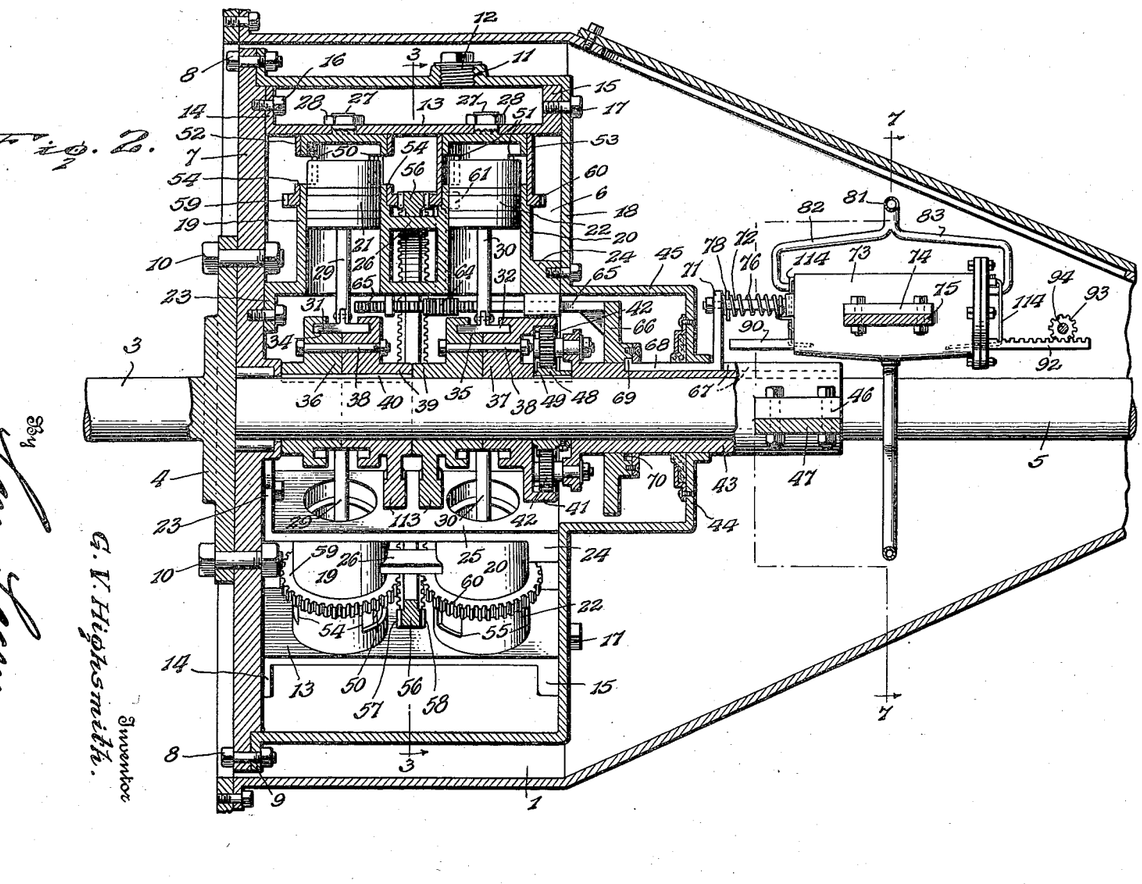
Figure 2 is an enlarged vertical sectional view taken longitudinally through the improved transmission.

This improved transmission is enclosed in a transmission housing I which is mounted in the usual manner at the rear of an engine 2, the engine being of a conventional construction and including the usual crank shaft 3 which terminates at its rear end in a disc or head 4 to which the improved transmission is secured, as shown in Figure 2, in order that rotary motion in either a forward or reverse direction may be transmitted from the power shaft 3 of the engine to the transmission shaft 5 by means of which motion is transmitted to the wheels of the automobile.

The casing I is open at its front end and within this casing is mounted the improved transmission mechanism which is principally disposed in the cylindrical forward portion of the casing, as shown in Figure 2, and acts not only as a transmission but also as a flywheel. Referring to Figure 2 it will be seen that the housing 6 of the transmission fits loosely about the transmission shaft 5 which may be referred to as a driven shaft, and at its forward end is secured to a closure disc 7 of thick metal by bolts 8 which extend through the reduced marginal portion of the closure disc and also through a circumferentially extending outstanding flange 9 formed about the housing. The thick disc 7 is firmly secured to the head or disc 4 of the power shaft 3 by bolts 10 and, therefore, the transmission housing and its closure disc will turn with the power shaft and together with mechanism within the housing and turning therewith serve as a flywheel for the power shaft. An opening 11 is formed in the annular wall of the housing in order that the housing may be filled with oil and this opening is normally closed by a plug 12 which is threaded into the opening in order that it may be removed if renewal or replenishing of the oil becomes necessary.

Figure 3:
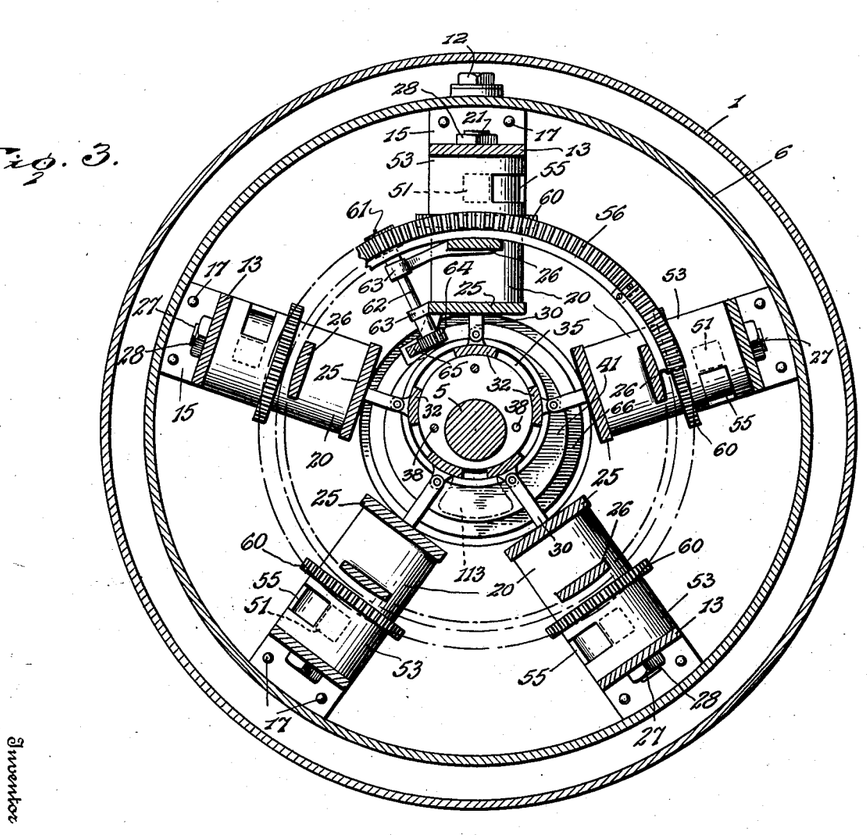
Figure 3 is a sectional view taken transversely through the transmission along the line 3—3 of Figure 2.

Cross bars or ridges 13, which may be referred to as mounting brackets, extend through the housing in spaced parallel relation to the transmission shaft with their end portions terminating in flanges 14 and 15 secured by bolts 16 and 17 against the disc 7 and the front wall 18 of the transmission housing and each of these bars or mounting brackets carries a pair of cylinders 19 and 20. The pairs of cylinders are of duplicate construction, each consisting of a cylinder 19 and piston 21 for imparting forward rotation to the transmission shaft and a cylinder 20 and associated piston 22 for imparting rotation to the transmission shaft in a direction to reverse movement of the automobile. These pairs of cylinders are spaced equal distances from each other, as shown in Figure 3, and while five pairs of cylinders have been illustrated in this figure, it is to be understood that any number of pairs of cylinders may be used. It is essential, however, that they be spaced from each other equal distances circumferentially of the housing. At their lower ends the cylinders of each pair are secured against the disc 7 and front wall 18 by bolts passing through flanges 23 and 24 at opposite ends of a lower bridge 25 which is preferably formed integral with the pair of cylinders but may be formed separate therefrom and secured to inner end portions of the cylinder in any desired manner. A web 26 extends between the cylinders intermediate their inner and outer ends and as the cylinders are secured at their inner ends by bolts passing through the flanges 23 and 24 and at their outer ends by threaded lugs 27 which pass through openings formed in the bracket 13 and carry nuts 28, the cylinders will be prevented from moving out of their proper position radially of the transmission housing.

Figure 7:
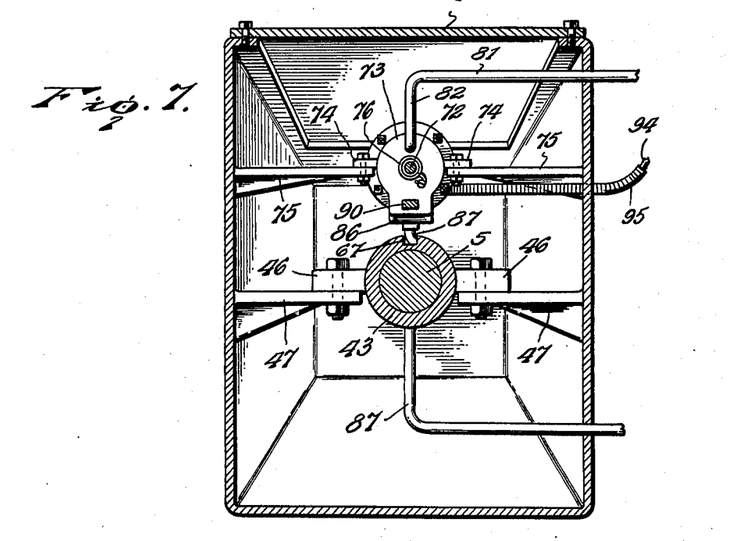
Figure 7 is a sectional view taken transversely through the improved transmission along the line 7—7 of Figure 2.

The pistons 21 and 22 which are slidably received in the cylinders 19 and 20 are provided with piston rods 29 and 30 which project from the open inner ends of the cylinders and are pivoted to shoes 31 and 32 which are arcuate, as shown in Figure 3, and received in the under cut grooves or channels 34 and 35 formed in cams 36 and 37 which surround the transmission shaft. These cams are each formed of companion sections secured together by bolts 38 and each cam includes a sleeve 39 which fits snugly about the transmission shaft, the sleeve of the cam 36 being keyed to the transmission shaft and the sleeve of the cam 37 being loose. As the cam 36 is secured to the shaft by the key 40 this cam and the shaft will turn as a unit but the cam 37 and the shaft 5 may have rotary motion relative to each other under certain conditions. The cam 37 is formed with an extension 41 and is formed with internal teeth to define an internal gear ring which meshes with gears or pinions 42 carried by a sleeve 43 which fits snugly about the transmission shaft. This sleeve 43 projects outwardly through the head 44 of an auxiliary housing or extension 45 forming part of the housing 6 and its outer end portion is formed with side arms 46 bolted to brackets 47 carried by and extending inwardly from opposite side walls of the rearwardly tapered portion of the transmission casing, as shown in Figure 7. Therefore, the sleeve 43 will be held against rotation and under certain conditions the gears or pinions 42 which are rotated by the extension or gear ring 41 may impart rotation to the gear 48 which is secured upon the shaft 5 by a key 49 and the shaft 5 will be turned in a direction to reverse movement of the automobile instead of turning in a direction to move the automobile forwardly. This will be hereinafter fully explained.

Figure 4:
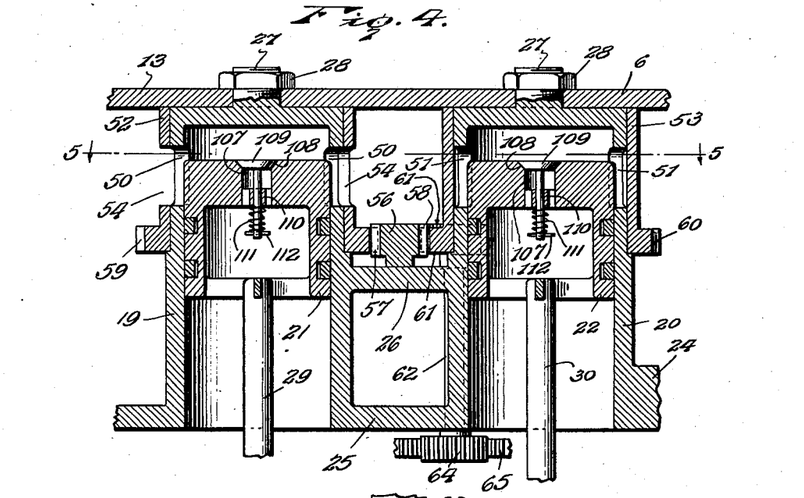
Figure 4 is a sectional view upon an enlarged scale of a pair of cylinders and pistons forming part of the transmission.

In order to control flow of oil through the ports 50 and 51 formed in the cylinders 19 and 20, there have been provided valves in the form of sleeves 52 and 53 which fit snugly about the reduced outer portions of the cylinders, as shown clearly in Figure 4, with their inner ends abutting the annular shoulders formed about the cylinders and their outer ends bearing against the brackets 13. These valves or sleeves are formed with openings 54 and 55 which are so located that they may be moved into and out of position to expose the openings 50 and 51 according to the direction in which the sleeves are turned. By referring to Figures 5 and 6 it will be seen that the openings 54 and 55 are twice the width of the companion openings 50 and 51 and so located with respect to the openings 50 and 51 that when the sleeves 52 and 53 are turned from the neutral position shown in Figure 6 in which the openings 50 are exposed through the openings 54 and the openings 51 are exposed through the openings 55, to the position shown in Fig. 5 exposed through the openings 55, the openings 50 will remain exposed through the openings 54 but the openings 51 will be covered by portions of the sleeve 53 and thus closed. This is due to the fact that the sleeves turn in opposite directions and rotation of the sleeve 52 in a clockwise direction for half the width of the openings 54 will still leave the openings 50 exposed, while turning of the sleeve 53 in an anti-clockwise direction will cause the unslotted portions of the sleeve to be moved into covering relation to the openings 51. Reversal of the direction in which the sleeves turn about the cylinders from the neutral position shown in Figure 6 will cause the openings 50 to be closed and the openings 51 to remain uncovered. It will thus be seen that turning of the sleeves from the neutral position shown in Figure 6 to the position shown in Figure 5 will expose the sleeves in position to effect rotation of the transmission shaft in a direction to reverse movement of the automobile, while turning of the sleeves from the neutral position in an opposite direction will cause the transmission shaft to rotate in a direction to move the automobile forwardly.

In order to impart rotary motion to the sleeves there has been provided a gear ring 56 formed of sections which, when united, will be supported by the web 26 between the cylinders 19 and 20. This gear or toothed ring has its opposite edge faces formed with teeth 57 and 58 which mesh with gears 59 and 60 formed about inner end portions of the sleeves 52 and 53 and from an inspection of Figure 5 it will be readily seen that when the ring or gear 56 is turned, the two sleeves will be rotated in opposite directions. This gear 56 has rotary motion imparted to it through the medium of a small gear or pinion 61 carried by a shaft 62 which is rotatably mounted in bearings 63. The shaft 62 extends radially of the gear 56 and at its inner end carries a pinion 64 which meshes with teeth of the rack bar 65 which extends longitudinally of the shaft 5 in spaced parallel relation thereto and is carried by a collar 66 which fits loosely about the sleeve 43 within the extension 45 of the casing 6. A groove 67 is formed longitudinally in the sleeve to slidably receive an adjusting rod or fork 68 having at its inner end a finger 69 engaged in the annular groove 70 of the collar. An arm 71 at the outer end of the rod 68 projects radially from the sleeve 43 and is secured to the outer end of a piston rod 72 extending longitudinally of the shaft 5 and into a cylinder 73 mounted in the transmission casing above the shaft 5 where it is supported, as shown in Figure 7, by arms 74 which are bolted or otherwise secured to brackets 75 extending from side walls of the transmission housing. Shifting of the rod 72 longitudinally and consequent shifting of the rod 68 imparts movement to the collar 66 and rod 65. Therefore, rotation will be imparted to the gear or ring 56 and adjust the valve sleeve for forward or reverse movement of the automobile according to the direction in which the piston rod 72 moves. A spring 76 serving as both an expansion and contraction spring, as it is secured at its ends to the head 77 of the cylinder and to the piston rod 72 by a pin 78, assists in normally retaining the piston rod in such position that the piston 79 carried by the rod within the cylinder 73 will be centered in the cylinder as indicated by dotted lines in Figure 8 and the valve sleeve will then be in the neutral position shown in Figure 6 and permit the power shaft 3 to rotate without rotary motion being transmitted to the shaft 5.

Figures 8, 10:
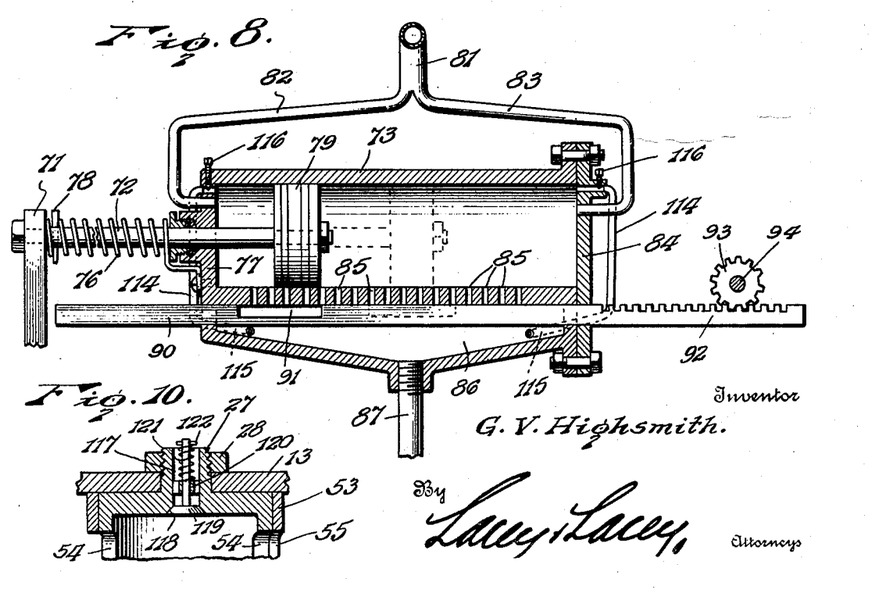
Figure 8 is a sectional view upon an enlarged scale taken longitudinally through the valve operating cylinder.
Figure 10 is a fragmentary view in section illustrating a slightly modified construction.

In order to move the piston 79 to adjusted position in the cylinder 73, there has been provided a pump 80 mounted externally of the motor 2 and operated in any desired manner but preferably driven from the motor. This pump has a pipe 81 leading from it into the transmission casing or housing where it is formed with branches 82 and 83 leading to the heads 77 and 84 of the cylinder 73 so that oil may be delivered under pressure into the cylinder 73 at opposite ends thereof. Oil passes from the cylinder through openings 85 formed in the lower portion thereof and into a drip pan 86 from which it flows through a pipe 87 which is extended outwardy through a side wall of the transmission casing and leads to a reservoir 88 mounted in a convenient manner at a side of the motor or engine 2 and having a pipe 89 leading from adjacent its bottom to the inlet of the pump 80. It will thus be seen that when the pump is in operation, oil will be drawn from the reservoir through the pipe 89, forced through the pipe 80 under pressure into end portions of the cylinder 73 and after passing from the cylinder through the outlet openings 85 flow through the pipe 87 back to the reservoir. When an equal number of the openings 85 at opposite sides of the piston are unobstructed, the oil will flow through these openings and back to the reservoir without moving the piston and the piston rod 72 in either direction and the valves 52 and 53 will remain in the neutral position. When, however, the openings between the piston and one end of the cylinder 73 are obstructed, the oil entering this end portion of the cylinder will exert pressure against the piston to move it longitudinally in the cylinder until openings are again exposed at both sides of the piston. At which time the piston will cease its movement due to equalization of pressure and the valves 52 and 53 will be held in unadjusted position. In order to control passage of oil through the openings 85, there has been provided a valve bar 90 which extends longitudinally of the cylinder 73 between the drip pan 86 and the cylinder with its upper face bearing against the under portion of the cylinder in which the line of openings 85 has been formed. A recess 91 is formed in the valve bar which extends longitudinally thereof and is of greater length than the thickness of the piston. Therefore, when the valve bar is in the neutral position with the recess 91 intermediate the length of the cylinder, as indicated by dotted lines in Figure 8, and the piston is also in the neutral position, end portions of the passage or recess 91 will be exposed at opposite sides of the piston and oil can leave the cylinder from both end portions thereof. When, however, the valve bar is shifted longitudinally to an unadjusted position such as shown in Figure 8, the openings between the piston and one end portion of the cylinder will all be blocked by the bar and pressure exerted by the oil will then move the piston to an adjusted position such as shown in this figure where it will be held due to the fact that pressure will then be equalized and also due to the fact that any attempt of the piston to return to the neutral position will close openings as it moves. In order to control movement of the valve bar one end portion thereof has been formed with teeth thus forming of this end portion of the bar a rack 92, the teeth of which are engaged by a pinion 93 carried by a flexible shaft 94 which extends outwardly from the transmission casing and is enclosed in a flexible cable or jacket 95. The flexible shaft and its jacket extend upwardly from the transmission casing to a plate 96 which is preferably carried by a bracket 97 clamped about the steering column 98 housing the steering post 99, and, therefore, the actuating handle 100 fixed to the upper end of the flexible cable will be disposed in such a position that it may be very easily reached by the driver holding the steering wheel 101. It will be understood, however, that the plate 96 may be mounted in the instrument board or at any other location if so desired. The plate is marked to indicate neutral, as shown at 102, and also for reverse and forward at 103 and 104 in order that the driver of the automobile will not be likely to move the handle in the wrong direction when imparting rotary motion to the flexible shaft. Abutments 105 and 106 are provided to limit movement of the handle when shifting it.

When this improved transmission is in use, it is mounted in the transmission housing and operatively connected with the power shaft 3 of the engine and the transmission shaft 5 as shown in Figure 2 and previously described. As the plate 7 of the casing or housing 6 is secured to the disc 4 of the engine shaft, this casing and the cylinders and pistons turn with the engine shaft and act as a flywheel for the engine. The sleeve 43 remains stationary in the transmission casing but the disc 66 turns with the casing 6. When the sleeve valves are in the neutral position oil may pass freely through the openings of all of the cylinders and, therefore, the pistons 21 and 22 may slide freely in the cylinders as they move about the cams 36 and 37 and rotary motion will not be imparted to the transmission shaft 5 in either direction. When it is desired to drive forwardly, the handle 100 is grasped and swung from the neutral position toward the abutment 106 and during this movement rotary motion will be imparted to the flexible shaft to turn the pinion 93 and shift the valve bar longitudinally of the cylinder 73, thus causing movement to be imparted to the piston 79 and the fork or rod 68 to shift the disc 66 along the sleeve 43 and rotate the shaft 62 in a direction to rotate the ring 56 and move the valve rings or sleeves in a direction to close the openings 50, while leaving the openings 51 still uncovered. Flow of oil through the openings 50 will thus be checked or entirely cut off according to the distance the valve sleeves are moved and free sliding movement of the pistons 21 will be retarded or entirely prevented. It will thus be seen that the cam 36 and the shaft 5 to which it is fixed will be caused to turn with the casing 6 at either reduced or high speed and the shaft 5 will impart rotation to the traction wheels of the automobile to move it forwardly. To increase or decrease the speed at which the automobile is moving forwardly, it is merely necessary to increase or decrease the extent to which the openings 50 are covered and the automobile will change its speed very smoothly in accordance with the slippage permitted between the pistons 21 and the cylinders 19. As the openings are gradually closed and slippage between the pistons 21 and the cylinders correspondingly reduced, the speed at which the shaft 5 turns will be gradually changed from low to high speed instead of in step by step movements and jolts due to sudden increase or decrease of speed will be avoided. Ports 107 are formed through heads of the pistons centrally thereof and each has its outer portion enlarged to form a valve seat 108. A spider 110 is provided at the inner end of each port to slidably receive the stem of a valve 109 which moves inwardly into position to seat against the seat 108 and close the port 107 and in order to yieldably resist outward movement of the valves to an opened position each valve stem carries a spring coiled about the stem and bearing against the pin 112 and the spider. By providing the pistons with the outwardly opening valves, oil may force its way through the ports 107 when the pistons are moving towards the open inner ends of the cylinders and prevent formation of a vacuum in the cylinders. During rotation of the shaft in a forward direction, the cam 37 has rotary motion imparted to it by the gear 48 and pinions 42 but as the openings 51 are uncovered and the pistons 22 slide freely in the cylinders 20, rotation of the shaft 5 will not be retarded by the pistons 22. In order to stop rotation of the shaft 5, it is merely necessary to return the valve sleeves to the neutral position and rotation will no longer be transmitted from the shaft 3 to the shaft 5. The brakes of the automobile may then be applied to stop forward movement in the usual manner.

Figures 5, 6:
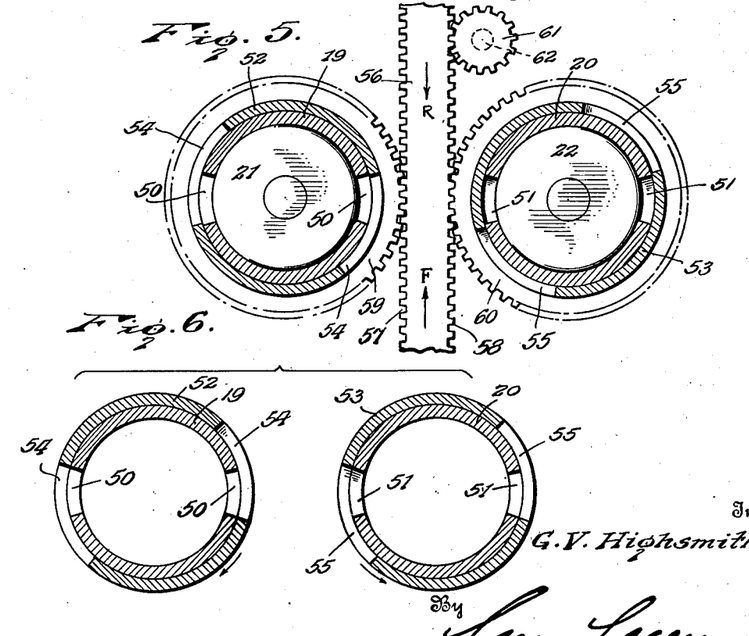
Figure 5 is a fragmentary sectional view taken along the line 5—5 of Figure 4 and showing the valve of the cylinder set in a reversing position to cause rearward movement of an automobile.
Figure 6 is a sectional view showing the valve in a neutral position.

In order to reverse movement of the automobile and move it rearwardly, the valve rings are moved towards the position shown in Figure 5 in which position the openings 51 are closed and the openings 50 remain open. The pistons 21 may then slide freely in the cylinders 19 but the pistons 22 will be held stationary and the cam 37 will turn with the casing 6. During this movement, rotary motion will be imparted to the pinions or gears 42 and as these gears mesh with the gear 48 which is fixed to the shaft 5, the shaft 5 will be rotated in a direction opposite to that in which it moves to propel the automobile forwardly and the automobile will be backed either at low or high speed according to the extent to which the openings 51 are closed. Counterbalance weights 113 are carried by the cams 36 and 37 at the opposite side of the shaft 5 from the extended portions of these cams to prevent jerking movement when the cams are rotating. When an automobile is coasting down a hill or it is desired to quickly bring it to a stop, the valve rings or sleeves may be moved to the reversing position in which rotation of the shaft 5 in a forward direction will be retarded and the transmission may then serve as a power brake to quickly bring the automobile to a stop or prevent excessive speed when coasting down a hill. In order to permit excessive pressure in the cylinder 73 to be compensated for, there has been provided bypasses in the form of small tubes 114 which lead from upper ends of the heads 77 and 84 and extend downwardly with their lower portions bent inwardly and entering end portions of the pan, as shown at 115. Needle valves 116 are threaded into place with their tapered ends entering the tubes 114 near upper ends thereof. By this arrangement, flow of oil through the bypasses may be entirely cut off, if so desired, or the needle valve turned in an opening direction to permit a certain amount of the oil to escape through the bypasses. Therefore, when pressure in the cylinder between the piston and one end thereof is too great, a portion of the oil may escape and likelihood of damage due to overpressure will be prevented. The needle valves also serve to control flow of fluid so that when the engine or driving source is slowed down either by excess load or by the operator, the pump 80 will pump less oil until a point is reached at which the oil will run out through the tubes 114 faster than it is being pumped into the cylinder. The automatic control will then let the piston come towards the center and shift the transmission to the neutral position and thus prevent the engine from stalling. As soon as the engine speeds up it will shift into gear again.

In Figure 10 there has been shown a slightly modified construction wherein instead of providing the pistons 21 and 22 with valves, the lugs or stems 27 will be formed with passages 117 taking the place of the passages 107 and having valve seats 118 at their inner ends for engagement by valves 119, the stems of which extend outwardly through the passages and through the spiders 120 mounted in the passages 115. A spring 121 encircles the stem of each valve 119 and by bearing against the pin 122 yieldably holds the valve closed. The valves 119 serve to prevent formation of a vacuum in the cylinders.

Having thus described the invention, what is claimed as new is:

1. In a transmission, a power shaft, a driven shaft, a casing about the driven shaft turning with the power shaft, hydraulic means in said casing for transmitting motion from the power shaft to the driven shaft and rotating the driven shaft in the same direction as the power shaft including a piston operating in a cylinder carried by the casing and a cam for actuating the piston fixed to the driven shaft, companion hydraulic means for reversing rotation of the driven shaft including a piston operating in a cylinder carried by the casing and a cam for actuating the piston having geared connection with the driven shaft for reversing rotation thereof, each hydraulic means having its cylinder provided with a port and being provided with a valve movable from an open position rendering the hydraulic means inactive towards a closed position to render the hydraulic means active, means for simultaneously imparting movement to said valves and rendering one hydraulic means active while the other remains inactive, and actuating means for the last mentioned means operable to effect adjustment of the valves to render a selective hydraulic means active.

2. In a transmission, a power shaft, a driven shaft, a casing about the driven shaft turning with the power shaft, hydraulic means in said casing for transmitting motion from the power shaft to the driven shaft and rotating the driven shaft in the same direction as the power shaft, companion hydraulic means for reversing rotation of the driven shaft, each hydraulic means including a cylinder extending radially of the driven shaft and having a port in its outer portion, a cam carried by the driven shaft, a piston in said cylinder connected with the cam and slidable in the cylinder to render the hydraulic means inactive when the port is open, the cam for the first hydraulic means being fixed to the driven shaft to cause turning of the driven shaft in the same direction as the power shaft, a geared connection between the driven shaft and the cam of the second hydraulic means to reverse rotation of the driven shaft, a sleeve valve rotatable about the cylinder and formed with an opening movable from a position exposing the port when the sleeve is turned into position to close the port and prevent sliding of the piston and render the hydraulic means active to cause rotation of the driven shaft, means for imparting rotation to the sleeves of the cylinders to close the port of one cylinder while the port of the other cylinder remains open, and actuating means for the last mentioned means operable to effect adjustment of the sleeves and render a selected hydraulic means active.

3. In a transmission, a power shaft, a driven shaft, a casing about the driven shaft turning with the power shaft, hydraulic means in said casing for transmitting motion from the power shaft to the driven shaft and rotating the driven shaft in the same direction as the power shaft, companion hydraulic means for reversing rotation of the driven shaft, each hydraulic means including a cylinder extending radially of the driven shaft and having a port in its outer portion, a cam carried by the driven shaft, a piston in said cylinder connected with the cam and slidable in the cylinder to render the hydraulic means inactive when the port is open, the cam for the first hydraulic means being fixed to the driven shaft to cause turning of the driven shaft in the same direction as the power shaft, a geared connection between the driven shaft and the cam of the second hydraulic means to reverse rotation of the driven shaft, a sleeve valve rotatable about the cylinder and formed with an opening movable from a position exposing the port when the sleeve is turned into position to close the port and prevent sliding of the piston and render the hydraulic means active to cause rotation of the driven shaft, the openings of the sleeves being of greater length circumferentially of the cylinders than the ports of the cylinders whereby during turning of the sleeves the opening of one sleeve may remain in registry with the port of the cylinder carrying the same while the other sleeve is turning in a direction to close the port of its companion cylinder, and means for imparting rotation to the sleeves to render a selected one of the hydraulic means active and cause the driven shaft to rotate in a predetermined direction.

4. In a transmission, a power shaft, a driven shaft, a casing about the driven shaft turning with the power shaft, hydraulic means in said casing for transmitting motion from the power shaft to the driven shaft and rotating the driven shaft in the same direction as the power shaft, companion hydraulic means for reversing rotation of the driven shaft, each hydraulic means including a cylinder extending radially of the driven shaft and having a port in its outer portion, a cam carried by the driven shaft, a piston in said cylinder connected with the cam and slidable in the cylinder to render the hydraulic means inactive when the port is open, the cam for the first hydraulic means being fixed to the driven shaft to cause turning of the driven shaft in the same direction as the power shaft, a geared connection between the driven shaft and the cam of the second hydraulic means to reverse rotation of the driven shaft, a sleeve valve rotatable about the cylinder and formed with an opening movable from a position exposing the port when the sleeve is turned into position to close the port and prevent sliding of the piston and render the hydraulic means active to cause rotation of the driven shaft, the openings of the sleeves being of greater length circumferentially of the cylinders than the ports of the cylinders whereby during turning of the sleeves the opening of one sleeve may remain in registry with the port of the cylinder carrying the same while the other sleeve is turning in an opposite direction to close the port of its companion cylinder, gears carried by said sleeves and extending circumferentially thereof, the cylinders being spaced from each other longitudinally of the casing and driven shaft, a gear ring rotatably mounted between the cylinders and meshing with the gears of said sleeves, and means for rotating the gear ring in a selected direction for imparting rotation to the sleeves to render a selected one of the hydraulic means active and cause the driven shaft to rotate in a predetermined direction.

5. In a transmission, a power shaft, a driven shaft, a casing about the driven shaft turning with the power shaft, cams carried by the driven shaft within the casing, one cam being fixed to the shaft and the other loose, gearing between the loose cam and driven shaft, pairs of cylinders mounted in said casing and extending radially of the driven shaft with their open ends facing the shaft, pistons in said cylinders having rods projecting from the inner ends of the cylinders and engaging the cams for sliding the pistons in the cylinders, the outer portions of the cylinders having side ports formed therein whereby fluid may enter and leave the cylinders and permit free sliding of the cylinders and pistons relative to each other during turning of the casing when the ports are open and prevent transmission of rotation from the power shaft to the driven shaft, and means for closing the ports of a selected one of each pair of cylinders to prevent sliding of the pistons therein and cause rotation of the driven shaft in a predetermined direction.

6. In a transmission, a power shaft, a driven shaft, a casing about the driven shaft turning with the power shaft, cams carried by the driven shaft within the casing, one cam being fixed to the shaft and the other loose, gearing between the loose cam and driven shaft, pairs of cylinders mounted in said casing and extending radially of the driven shaft with their open ends facing the shaft, pistons in said cylinders having rods projecting from the inner ends of the cylinders and engaging the cams for sliding the pistons in the cylinders, the outer portions of the cylinders having side ports formed therein whereby fluid may enter and leave the cylinders and permit free sliding of the cylinders and pistons relative to each other during turning of the casing when the ports are open and prevent transmission of rotation from the power shaft to the driven shaft, sleeves rotatable about outer portions of said cylinders formed with openings moved into and out of registry with the ports by turning the sleeves about the cylinders, gears carried by said sleeves, a gear ring rotatably mounted with its teeth meshing with the gears of said sleeves, a shaft extending radially of the gear ring and having geared connection therewith, and means for rotating the last gear to move the sleeves into position for closing the ports of a selected one of each pair of cylinders to prevent sliding of the pistons therein and cause rotation of the driven shaft in a predetermined direction.

7. In a transmission, a power shaft, a driven shaft, a casing about the driven shaft turning with the power shaft, pairs of cylinders mounted in the casing radially of the driven shaft with their open inner ends facing the shaft and their outer portions formed with side ports, pistons slidable in said cylinders with their rods projecting from the open inner ends thereof, a sleeve about said driven shaft held stationary, a gear secured about the driven shaft, pinions carried by said sleeve and meshing with the gear, cams for sliding said pistons carried by said driven shaft, one cam being fixed upon the shaft and the other loose and carrying an internally toothed gear surrounding and meshing with the pinions to impart rotation to the driven shaft in a direction reverse to that of the power shaft when the loose cam turns with the casing, valves rotatable about the outer portions of the cylinders for movement into and out of closing relation to their ports, a gear ring for turning said valves, a shaft geared to the gear ring and carrying a pinion, a collar loose upon said sleeve, a rack bar extending longitudinally of the shaft and meshing with the last mentioned pinion, and means for shifting the collar along the sleeve and transmitting rotation to the valves to close the ports of a selected one of each pair of cylinders to interrupt sliding of the pistons therein and effecting rotation of the driven shaft in a predetermined direction.

8. In a transmission, a power shaft, a driven shaft, pairs of cylinders extending radially of the driven shaft, and moving with the power shaft and formed with ports, a fixed cam carried by the driven shaft, a loose cam carried by the driven shaft and having geared connection with the driven shaft, pistons in said cylinders connected with the cams to receive sliding movement therefrom when the ports are open, valves movable into and out of closing relation to the ports, means for adjusting the valves including a member loose about the driven shaft, and actuating means for sliding the member longitudinally of the driven shaft and adjusting the valves to retard sliding of the piston in one cylinder of each pair to cause rotation of the driven shaft in a predetermined direction, said actuating means including a cylinder having inlets at its ends and outlets along its lower portion, a piston normally centered in the cylinder with its rod projecting from one end thereof, a fork carried by the piston rod and engaging said member to shift the same along the driven shaft when the piston is moved, means for circulating fluid through said cylinder, and means for controlling flow of fluid through the outlets of the cylinder.

9. In a transmission, a power shaft, a driven shaft, pairs of cylinders extending radially of the driven shaft and moving with the power shaft and formed with ports, a fixed cam carried by the driven shaft, a loose cam carried by the driven shaft and having geared connection with the driven shaft, pistons in said cylinders connected with the cams to receive sliding movement therefrom when the ports are open, valves movable into and out of closing relation to the ports, means for adjusting the valves including a member loose about the driven shaft, and actuating means for sliding the member longitudinally of the driven shaft and adjusting the valves to retard sliding of the piston in one cylinder of each pair to cause rotation of the driven shaft in a predetermined direction, said actuating means including a cylinder having inlets at its ends and outlets along its lower portion, a piston normally centered in the cylinder with its rod projecting from one end thereof and connected with said member, means for circulating fluid through said cylinder, a valve bar slidable longitudinally under the cylinder and formed with a passage for exposing certain of the outlets, and means for shifting the valve bar longitudinally.

GALE V. HIGHSMITH.